Aug. 1, 1961   R. H. McCORMICK   2,994,236
MACHINE CLAMP
Filed July 13, 1959   2 Sheets-Sheet 1
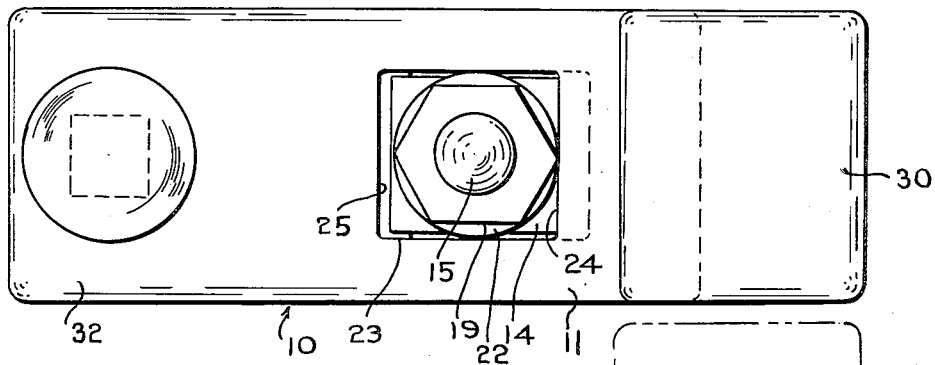
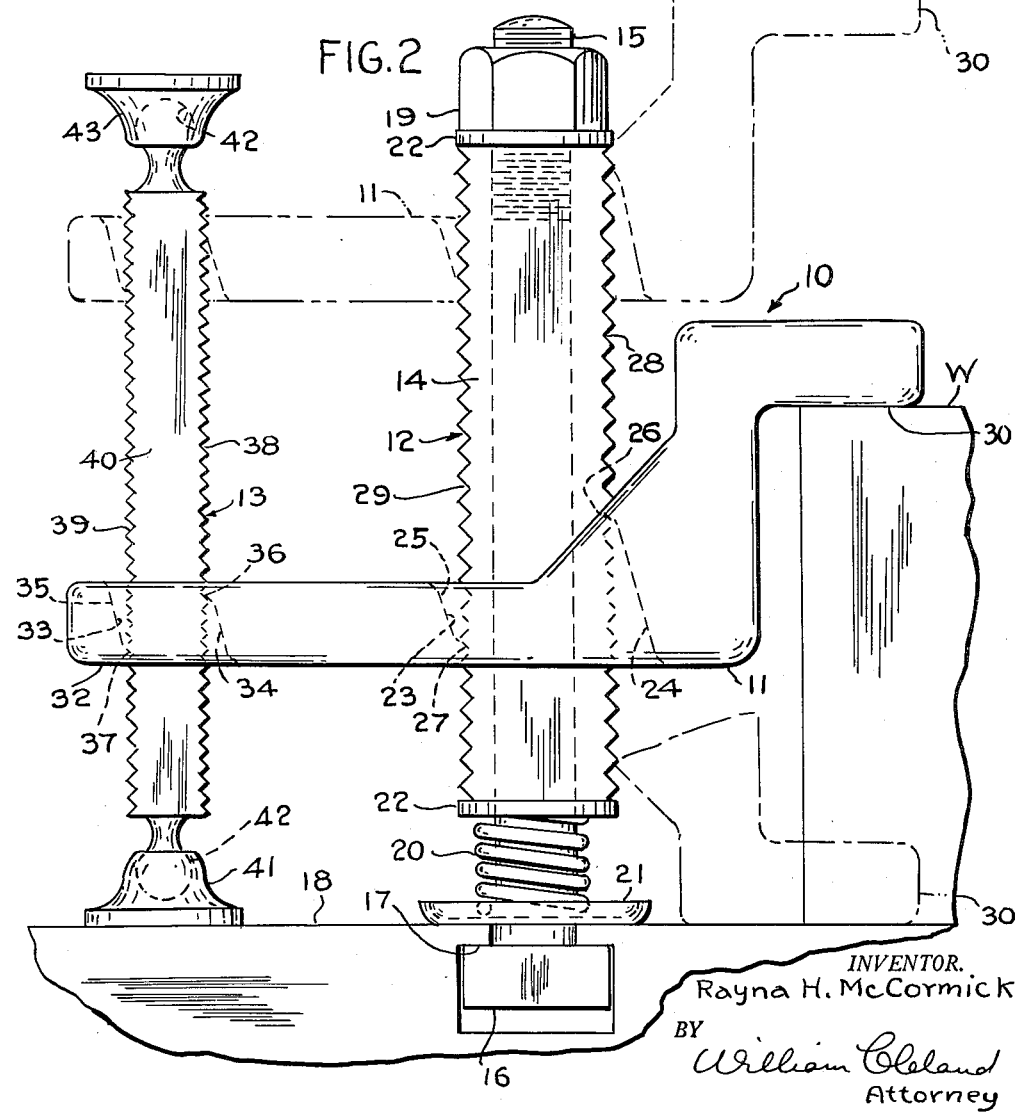
INVENTOR.
Rayna H. McCormick
BY
William Cleland
Attorney

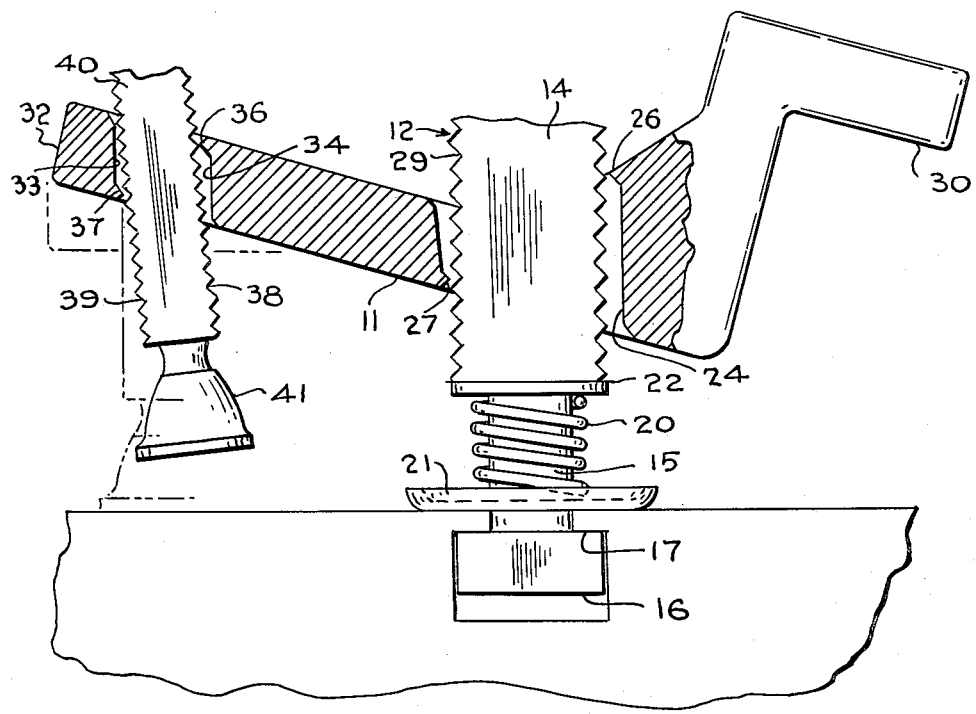

United States Patent Office 2,994,236
Patented Aug. 1, 1961

2,994,236
MACHINE CLAMP
Rayna H. McCormick, Akron, Ohio, assignor to J-Dapter Company, Akron, Ohio, a corporation of Ohio
Filed July 13, 1959, Ser. No. 826,734
14 Claims. (Cl. 77—63)

This invention relates to a clamp for clamping work against a work-supporting table of a machine, such as a drill press or the like.

In the past, clamps of various kinds have been provided for holding work on a machine table. These, however, have been generally unsatisfactory for various reasons, such as that they required too many separate parts which were difficult to assemble or adjust, or that certain parts were sometimes lost or misplaced. Other devices were restricted in the uses of the same or were inefficient in operation.

One object of the present invention is to provide a unitary clamp of the character described which is adjustable to clamp a wide range of sizes of work on a machine table, that is, without necessarily assembling the clamp, or substituting parts in the same.

Another object of the invention is to provide a clamp of the character described which is initially manually adjustable to the work by relative angular movement of parts of the clamp followed by use of a wrench or like tool to attain full clamping pressure on the work.

Still another object of the invention is to provide a clamp of the character described in which the several parts of the same are easily retained together as a unit, whereby loss or misplacement of parts is obviated.

Other objects of the invention will be manifest from the following brief description and the accompanying drawings.

Of the accompanying drawings:

FIGURE 1 is a top plan view of a machine clamp embodying the features of the invention.

FIGURE 2 is a front elevation thereof, on the same scale, adjustment of parts of the clamp being illustrated in full and chain-dotted lines.

FIGURE 3 is a fragmentary front elevation, corresponding in part to FIGURE 2 and partly broken away and in section, illustrating the manner of tilting parts of the clamp initially to adjust the same for clamping work on a work-supporting table of a machine.

Referring particularly to FIGURES 1 and 2, there is illustrated a machine clamp 10 embodying the features of the invention, including a work-clamping member 11 vertically adjustable on an anchoring element 12, and a fulcruming support or stem 13 on which the member 11 is also vertically adjustable in a manner to be described.

The anchoring element 12 may include an elongated sleeve 14 of squared cross-section longitudinally slidably received on a bolt 15 having a T-shaped inner end 16, which is adapted to be slidably received in a T-shaped slot 17 of known character in the top face 18 of a work-supporting table of a drilling or like machine (not shown). Bolt 15 may be held anchored in slot 17 by a nut 19, threaded on the upper end of the bolt to apply pressure to the upper end of sleeve 14 against the action of a compression spring 20 between the lower end of the sleeve and a dished shoe 21, which is thereby yieldingly pressed against the table surface 18. If desired washers 22, 22 may be provided at opopsite ends of sleeve 14.

Clamping member 11 has a squared opening 23 therethrough for free sliding reception of the sleeve 14 when the member is tilted clockwise from the full-line position thereof shown in FIGURE 2, or as substantially shown in full lines in FIGURE 3. In other words, laterally opposed parallel walls 24 and 25 of member opening 23 are inclined at an acute angle to the general plane of the member. Above and below said plane of the member, on the walls 24 and 25, respectively, may be single elongated, parallel teeth 26 and 27, protruding inwardly of said walls at diagonally opposite points with respect to a plane at a substantial angle to the longitudinal axis of bolt 15, said teeth 24 and 25, in the full-line, upwardly tilted locking position of member 11 being engageable with selected complemental notches of serrated portions 28 and 29 along laterally opposed flat-sides of the sleeve. As best shown in FIGURE 3, the outer edges of the parallel teeth 24 and 25 are in parallel planes of unconfined greater spacing than the spacing of the parallel serrated flat sides of the sleeve, whereby member 11, in the downwardly tilted position shown in full lines in FIGURE 3, is vertically freely movable with respect to the sleeve 14 until an upwardly offset extension 30 on the member can be adjusted approximately to the top of work W on table surface 18, after which the member is tiltable to the horizontal position of FIGURE 2, in which further tilting is prevented by engagement of the teeth 26 and 27 thereon with selected corresponding serrations on the sleeve 14.

The member 11 may have a lateral extension 32 at the side of the element 11 opposite to the offset extension 30, said lateral extension having a squared recess 33 therethrough to have laterally spaced walls 34 and 35 at an angle parallel to the walls 24 and 25 of opening 23, for free sliding reception of an elongated supporting stem 40. That is, the walls 34 and 35 are inclined at an acute angle to general plane of the member 11 and the extension 32 thereof. On the walls 34 and 35, respectively, above and below said plane, may be single elongated teeth 36 and 37 which, in the full line FIGURE 2 position, engage with selected complemental serrations of serrated portions 38 and 39 along laterally opposed flat sides of the stem 40. In other words, the stem is locked in vertically adjusted positions of the member 11 by tilting it relatively of the member, as from the relative position shown in full lines in FIGURE 3 to the relative position shown in full lines in FIGURE 2, substantially in the same manner as for adjustment of the clamping member with respect to element 12. To facilitate proper adjustment of the stem 40 against the table surface 18, the stem may have a flat-bottomed foot 41 swivelly attached to the lower end thereof, as by a ball and socket connection 42. The upper end may have a similar swivelly connected foot 43 for use when the clamping member 11 is reversed on the sleeve 14 to have the clamping extension 30 offset downwardly, as shown in chain-dotted lines in the lower portion of FIGURE 2.

In use of the improved clamping device 10, it may be normally conveniently stored or kept with clamping member 11, element 12, and stem 40 assembled as shown in FIGURES 1 and 2, but possibly not anchored to table surface 18. For clamping work W on a table surface 18 the bolt 15 is first anchored thereto by inserting the T-shaped end 16 thereof in the T-shaped slot 17, against the strong resilient pressure of spring 20 on the shoe 21.

Next, the operator tilts the member 11 with respect to the element 12, as shown in FIGURE 3, to position the clamping extension 32 at the approximate height of work to be clamped on table surface 18, and then tilts the member 11 to the locked position corresponding to that shown in full lines in FIGURE 2, but in which the clamping extension 30 is at or near engagement with the top of the work W. At this point the stem 40 may also have been slidably adjusted with respect to member extension 32, to an approximate relative position shown in full lines in FIGURE 3, so as to support the extension 32 substantially in a horizontal locked position when the member 11 is in the tilted full line position of FIGURE 2, wherein the stem is supported with the lower foot 41 flatly on the table surface 18.

Accordingly, when nut 19 is tightened on bolt 15, the sleeve 14 is urged downwardly against the resiliency of spring 20, thereby to clamp the clamping extension 30 downwardly against the work W. The toothed locking engagement of member extension 32 with the stem 40 provides a fulcruming point about which the screw pressure on the sleeve 14 urges the member 11 downwardly as a lever, with a resultant mechanical advantage in the form of greatly increased clamping pressure, applied to work W by the extension 30. Conversely, the work is easily released, by releasing the pressure of the nut 19, so that the clamping device 10 either may be retained with the various parts thereof in the same relative positions for clamping other work, or with the same adjusted as described for work of different height, as for example as shown in chain-dotted lines at the top of FIGURE 2. Any desired number of such clamping devices 10 may be utilized for clamping the work W.

For clamping relatively thin or small work W the clamping member 11 may be inverted on the sleeve 14, from the top end thereof, to have the member extension 30 in the relative position shown in chain-dotted lines at the lower portion of FIGURE 2. When this is done the stem 40 is simply inverted with member 11, so that the foot 43 thereof will engage the table 18.

Thus has been shown and described a simple and effective clamping device which is quickly adjustable to clamp work within a wide range of different heights of the same, and without changing or substituting parts of the device. The arrangement of the parts is such that the device may be retained in assembled condition, ready for immediate use at all times, and without loss of time due to lost or misplaced parts.

Modifications of the invention may be resorted to without departing from the spirit thereof or the scope of the appended claims.

What is claimed is:

1. A machine or like clamp, comprising an elongated element having laterally opposed parallel sides provided with serrations defining longitudinally extending series of parallel notches and teeth, said element having means at one end thereof for anchoring the same on a work-supporting table to be outstanding with respect thereto, and a clamping member having an opening therethrough defining laterally opposed walls having parallel teeth protruding inwardly thereof at diagonally opposite points with respect to a plane at a substantial angle to the longitudinal axis of said element in a locking position in which the protruding teeth are selectively complementally engaged in corresponding diagonally opposite said notches of the element, said member having a laterally outward extension engageable with work supported on the table in opposition to tilting of the member tending to release the same from said tooth-engaging position, the outer edges of said parallel teeth of the member being in parallel planes of unconfined greater spacing than the spacing of the parallel sides of said elongated element to permit free reception of said element through said opening upon relative said tilting of the member from said locked position.

2. A machine or like clamp, comprising an anchoring bolt having means at one end thereof for anchoring the same on a work-supporting table to be outstanding with respect thereto, a sleeve axially slidably mounted on said bolt and having laterally opposed parallel sides provided with serrations defining longitudinally extending series of parallel notches and teeth, a clamping member having an opening therethrough defining laterally opposed walls having parallel teeth protruding inwardly thereof at diagonally opposite points with respect to a plane at a substantial angle to the longitudinal axis of said bolt in a locking position in which the protruding teeth are selectively complementally engaged in corresponding diagonally opposite said notches of said sleeve, said member having a laterally outward extension engageable with work supported on the table in opposition to tilting of the member tending to release the same from said tooth-engaging position, the outer edges of said parallel teeth of the member being in parallel planes of unconfined greater spacing than the spacing of the serrated parallel sides of said sleeve to permit free reception of said sleeve through said opening upon relative said tilting of the member from said locked position, and adjustable means for urging said sleeve axially inwardly of said bolt to clamp said outward extension of the locked member into tightening engagement with the work.

3. A clamp as set forth in claim 2, including adjustable means for urging said member into clamping engagement of said laterally outward extension thereof with the work, said member having a second laterally outward extension at the side of the element opposite to the work, and adjustable fulcrum means being provided on said second outward extension for fulcruming support thereof on the table in said locked position of the member.

4. A clamp as set forth in claim 2, wherein said adjustable means includes a nut threaded on the outer end of said bolt against the outer end of said sleeve.

5. A clamp as set forth in claim 2, wherein said adjustable means includes a nut threaded on the outer end of said bolt against the outer end of said sleeve, spring-pressed means being provided between the inner end of said sleeve and the table adapted yieldingly to resist clamping inward movement of the sleeve.

6. A clamp as set forth in claim 2, said member having a second laterally outward extension at the side of the sleeve opposite to the work, adjustable fulcrum means being provided on said second outward extension for fulcruming support thereof on the table in said locked position of the member.

7. A clamp as set forth in claim 1, including an elongated fulcrum stem having serrated portions on laterally opposite sides thereof defining series of parallel notches and teeth, said member having a second laterally outward extension at the side of the element opposite to the work provided with an aperture through the same for axial reception of said stem, said aperture defining laterally opposed walls having parallel teeth protruding inwardly thereof at diagonally opposite points with respect to a plane at a substantial angle to the axis of said stem in a locked position in which the last named protruding teeth are selectively complementally engaged in corresponding diagonally opposite said notches of the stem while the lower end of the same is in fulcruming support with the table, the outer edges of parallel teeth of the member aperture being in parallel planes of unconfined greater spacing than the spacing of said laterally opposite sides of the stem to permit free reception of said stem through said aperture upon relative tilting of the member from the locked position thereof with respect to the stem.

8. A clamp as set forth in claim 2, including an elongated fulcrum stem having serrated portions on laterally opposite sides thereof defining series of parallel notches and teeth, said member having a second laterally outward extension at the side of the element opposite to the work provided with an aperture through the same for axial reception of said stem, said aperture defining laterally opposed walls having parallel teeth protruding inwardly thereof at diagonally opposite points with respect to a plane at a substantial angle to the axis of said stem in a locked position in which the last named protruding teeth are selectively complementally engaged in corresponding diagonally opposite said notches of the stem while the lower end of the same is in fulcruming support with the table, the outer edges of said parallel teeth of the member aperture being in parallel planes of unconfined greater spacing than the spacing of said laterally opposite sides of the stem to permit free reception of said stem through said aperture upon relative tilting of the member from the locked position thereof with respect to the stem.

9. A clamp as set forth in claim 2, including an elongated fulcrum stem having serrated portions on laterally opposite sides thereof defining series of parallel notches and teeth, said member having a second laterally outward extension at the side of the element opposite to the work provided with an aperture through the same for axial reception of said stem, said aperture defining laterally opposed walls having parallel teeth protruding inwardly thereof at diagonally opposite points with respect to a plane at a substantial angle to the axis of said stem in a locked position in which the last named protruding teeth are selectively complementally engaged in corresponding diagonally opposite said notches of the stem while the lower end of the same is in fulcruming support with the table, the outer edges of said parallel teeth of the member aperture being in parallel planes of unconfined greater spacing than the spacing of said laterally opposite sides of the stem to permit free reception of said stem through said aperture upon relative tilting of the member from the locked position thereof with respect to the stem, spring-pressed means being provided between the inner end of said sleeve and the table adapted yieldingly to resist clamping inward movement of the sleeve.

10. A clamp as set forth in claim 1, including an elongated fulcrum stem having serrated portions on laterally opposite sides thereof defining series of parallel notches and teeth, said member having a second laterally outward extension at the side of the element opposite to the work provided with an aperture through the same for axial reception of said steam, said aperture defining laterally opposed walls having parallel teeth protruding inwardly thereof at diagonally opposite points with respect to a plane at a substantial angle to the axis of said stem in a locked position in which the last named protruding teeth are selectively complementally engaged in corresponding diagonally opposite said notches of the stem while the lower end of the same is in fulcruming support with the table, the outer edges of said parallel teeth of the member aperture being in parallel planes of unconfined greater spacing than the spacing of said laterally opposite sides of the stem to permit free reception of said stem through said aperture upon relative tilting of the member from the locked position thereof with respect to the stem, spring-pressed means being provided between the inner end of said sleeve and the table adapted yieldingly to resist clamping inward movement of the sleeve.

11. A clamp as set forth in claim 1, including an elongated fulcrum stem having serrated portions on laterally opposite sides thereof defining series of parallel notches and teeth, said member having a second laterally outward extension at the side of the element opposite to the work provided with an aperture through the same for axial reception of said stem, said aperture defining laterally opposed walls having parallel teeth protruding inwardly thereof at diagonally opposite points with respect to a plane at a substantial angle to the axis of said stem in a locked position in which the last named protruding teeth are selectively complementally engaged in corresponding diagonally opposite said notches of the stem while the lower end of the same is in fulcruming support with the table, the outer edges of said parallel teeth of the member aperture being in parallel planes of unconfined greater spacing than the spacing of said laterally opposite sides of the stem to permit free reception of said stem through said aperture upon relative tilting of the member from the locked position thereof with respect to the stem, said stem having a foot swivelly mounted on at least one end thereof for flatwise engagement with the table in various angular positions of the stand relative to the same.

12. A clamp as set forth in claim 2, wherein said adjustable means includes a nut threaded on the outer end of said bolt against the outer end of said sleeve, spring-pressed means being provided between the inner end of said sleeve and the table adapted yieldingly to resist clamping inward movement of the sleeve, said spring-pressed means including an apertured shoe through which the inner end of said bolt is received and a compression spring engaged between said shoe and the inner end of said sleeve.

13. A clamp as set forth in claim 2, including an elongated fulcrum stem having serrated portions on laterally opposite sides thereof defining series of parallel notches and teeth, said member having a second laterally outward extension at the side of the element opposite to the work provided with an aperture through the same for axial reception of said stem, said aperture defining laterally opposed walls having parallel teeth protruding inwardly thereof at diagonally opposite points with respect to a plane at a substantial angle to the axis of said stem in a locked position in which the last named protruding teeth are selectively complementally engaged in corresponding diagonally opposite said notches of the stem while the lower end of the same is in fulcruming support with the table, the outer edges of said parallel teeth of the member aperture being in parallel planes of unconfined greater spacing than the spacing of said laterally opposite sides of the stem to permit free reception of said stem through said aperture upon relative tilting of the member from the locked position thereof with respect to the stem, spring-pressed means being provided between the inner end of said sleeve and the table adapted yieldingly to resist clamping inward movement of the sleeve, said spring-pressed means including an apertured shoe through which the inner end of said bolt is received and a compression spring engaged between said shoe and the inner end of said sleeve.

14. A machine or like clamp, comprising an anchoring bolt having means at one end thereof for anchoring the same on a work-supporting table to be outstanding with respect thereto, a sleeve axially slidably mounted on said bolt and having laterally opposed parallel sides provided with serrations defining longitudinally extending series of parallel notches and teeth, a clamping member having an opening therethrough defining laterally opposed walls having parallel teeth protruding inwardly thereof at diagonally opposite points with respect to a plane at a substantial angle to the longitudinal axis of said bolt in a locking position in which the protruding teeth are selectively complementally engaged in corresponding diagonally opposite said notches of said sleeve, said member having a laterally outward extension engageable with work supported on the table in opposition to tilting of the member tending to release the same from said tooth-engaging position, the outer edges of said parallel teeth of the member being in parallel planes of unconfined greater spacing than the spacing of the serrated parallel sides of said sleeve to permit free reception of said sleeve through said opening upon relative said tilting of the member from said locked position, and adjustable means for urging said sleeve axially inwardly of said bolt to clamp said outward extension of the locked member into tightening engagement with the work, said anchoring means on said bolt including a T-shaped end for reception of a T-shaped slot in the work-supporting table.

References Cited in the file of this patent

UNITED STATES PATENTS

| | | |
|---|---|---|
| 928,657 | Howell | July 20, 1909 |
| 1,420,147 | Roberts | June 20, 1922 |

FOREIGN PATENTS

| | | |
|---|---|---|
| 750,101 | Germany | Dec. 14, 1944 |